US008435923B2

(12) United States Patent
Okun et al.

(10) Patent No.: US 8,435,923 B2
(45) Date of Patent: May 7, 2013

(54) COMPOSITIONS, MATERIALS INCORPORATING THE COMPOSITIONS, AND METHODS OF USING THE COMPOSITIONS AND MATERIALS

(75) Inventors: Nelya Okun, Cumming, GA (US); Craig Hill, Atlanta, GA (US); Zhen Luo, Duluth, GA (US)

(73) Assignee: Emory University, Atlanta, GA (US)

( * ) Notice: Subject to any disclaimer, the term of this patent is extended or adjusted under 35 U.S.C. 154(b) by 295 days.

(21) Appl. No.: 12/294,696

(22) PCT Filed: Mar. 29, 2007

(86) PCT No.: PCT/US2007/007590

§ 371 (c)(1),
(2), (4) Date: Aug. 20, 2010

(87) PCT Pub. No.: WO2008/054484

PCT Pub. Date: May 8, 2008

(65) Prior Publication Data

US 2010/0305387 A1 Dec. 2, 2010

Related U.S. Application Data

(60) Provisional application No. 60/898,608, filed on Jan. 31, 2007, provisional application No. 60/878,474, filed on Jan. 3, 2007, provisional application No. 60/787,002, filed on Mar. 29, 2006.

(51) Int. Cl.

| | |
|---|---|
| ***B01J 21/04*** | (2006.01) |
| ***B01J 23/02*** | (2006.01) |
| ***B01J 27/188*** | (2006.01) |
| ***B01J 27/138*** | (2006.01) |
| ***B01J 27/132*** | (2006.01) |
| ***B01J 27/128*** | (2006.01) |
| ***B01J 21/00*** | (2006.01) |
| ***B01J 23/00*** | (2006.01) |
| ***B01J 23/70*** | (2006.01) |
| ***B01J 23/74*** | (2006.01) |
| ***B01J 23/72*** | (2006.01) |

(52) U.S. Cl.
USPC ........... 502/439; 502/210; 502/226; 502/228; 502/229; 502/240; 502/244; 502/248; 502/305; 502/307; 502/319; 502/325; 502/337; 502/338; 502/345

(58) Field of Classification Search .......... 423/300–306, 423/326, 341, 385, 386, 395, 397, 463, 464, 423/593.1, 594.1, 594.13, 594.3, 594.5, 595, 423/599; 502/208, 210, 213, 254, 256, 305–307, 502/324, 325, 337, 338, 340, 345, 400, 406, 502/407, 226, 228, 229, 240, 244, 248, 319; 252/183.14, 183.11; 588/301–415
See application file for complete search history.

(56) References Cited

U.S. PATENT DOCUMENTS 6,074,437 A * 6/2000 Racherla et al. .................. 8/111
6,911,470 B1 * 6/2005 Schinazi et al. .............. 514/492

(Continued)

OTHER PUBLICATIONS

Okun et al., "Highly Reactive catalysts for aerobic thiether oxidation the Fe-substituted polyoxometalate/hydrogen dinitrate system", Journal of Molecular Catalysis A: Chemical 246 (2006) 11-17.*

(Continued)

*Primary Examiner* — Anthony J Zimmer
(74) *Attorney, Agent, or Firm* — Emery Patent Group

(57) ABSTRACT

Compositions, materials incorporating the compositions, and methods of use thereof, for the protection and/or decontamination of contaminants are disclosed.

5 Claims, 3 Drawing Sheets

U.S. PATENT DOCUMENTS

| | | | | |
|---|---|---|---|---|
| 7,097,858 | B2 * | 8/2006 | Hill et al. | 424/604 |
| 7,358,380 | B2 * | 4/2008 | Kortz et al. | 556/28 |
| 7,655,594 | B2 * | 2/2010 | Okun et al. | 502/302 |
| 7,691,289 | B2 * | 4/2010 | Okun et al. | 252/183.14 |
| 2003/0049330 | A1 * | 3/2003 | Hill et al. | 424/604 |
| 2003/0072811 | A1 * | 4/2003 | Hill et al. | 424/618 |
| 2003/0171604 | A1 * | 9/2003 | Mizuno et al. | 549/533 |
| 2003/0172590 | A1 * | 9/2003 | Bhattacharyya et al. | 48/198.7 |
| 2004/0185078 | A1 | 9/2004 | Hill | |
| 2004/0185116 | A1 * | 9/2004 | Hill et al. | 424/617 |
| 2004/0230086 | A1 * | 11/2004 | Okun et al. | 588/205 |
| 2005/0159307 | A1 * | 7/2005 | Okun et al. | 502/407 |
| 2007/0282140 | A1 * | 12/2007 | Kortz et al. | 568/959 |
| 2008/0187601 | A1 * | 8/2008 | Hill et al. | 424/603 |

OTHER PUBLICATIONS

Craig L. Hill et al., 2007, Catalysts for Aerobic Decontamination of Chemical Warfare Agents under Ambient Conditions, ACS Symposium Series, vol. 980 Chapter 12, pp. 198-209.
Luo, The Polyoxometalate / NOx /Brx Catalysts forAerobic Sulfoxidations, PhD dissertation, 2009.
Luo et al., 2011, Mechanistic Studies of O2-Based Sulfoxidations Catalyzed by NOx/Br Systems, ACS Catal., 1, 1364-1370.

* cited by examiner

COMPOSITIONS, MATERIALS INCORPORATING THE COMPOSITIONS, AND METHODS OF USING THE COMPOSITIONS AND MATERIALS

CROSS REFERENCE TO RELATED APPLICATION

This application claims priority to "Compositions, Materials Incorporating the Compositions, and Methods of Using the Compositions and Materials," having serial number PCT/US2007/007590, filed on Mar. 29, 2007. This application also claims priority to and benefit of U.S. Provisional Patent entitled "Compositions, Materials Incorporating the Compositions, and Methods of Using the Compositions and Materials," having Application No. 60/787,002, filed on Mar. 29, 2006, U.S. Provisional Patent entitled "Compositions, Materials Incorporating the Compositions, and Methods of Using the Compositions, and Materials," having application No. 60/878,474, filed on Jan. 3, 2007 and US Provisional entitled "Compositions, Materials Incorporating the Compositions, and Methods of Using the Compositions, and Materials," having application No. 60/898,608, filed on Jan. 31, 2007, which are incorporated by reference in their entirety.

STATEMENT REGARDING FEDERALLY SPONSORED RESEARCH OR DEVELOPMENT

This invention was made with government support under grant numbers DAAD16-03-C-0070 and DAAD19-02-D-0001 awarded by U.S Army. The government has certain rights in the invention.

BACKGROUND

Decreasing the danger of contaminants (e.g., sulfur compounds, aldehydes, and warfare agents) and, has long been a significant issue. Compositions that can protect and/or remove contaminants from the environment in which people, such as military or office personnel, are operating can significantly decrease problems associated with contaminants. Various compositions have been used, but in many instances the compositions do not protect and/or remove contaminants in an efficacious manner. Thus, a

SUMMARY

Briefly described, embodiments of this disclosure include compositions, materials incorporating the compositions, and methods of use thereof, for the protection and/or decontamination of contaminants, and the like. An embodiment of a composition, among others, includes: a compound having the formula Me/POM/$NO_x$, where "Me" can be independently selected from: copper (Cu), iron (Fe), chromium (Cr), cobalt (Co), nickel (Ni), manganese (Mn), and zinc (Zn); where POM is a polyoxometalate; and where "x" is 1 or 2.

An embodiment of a composition, among others, includes: a compound having the formula Me/POM/$NO_x$, where "Me" can be independently selected from: copper (Cu), iron (Fe), chromium (Cr), cobalt (Co), nickel (Ni), manganese (Mn), and zinc (Zn); where POM is a polyoxometalate; and where "x" is 1 or 2. The composition further includes: a compound having the formula $EMe(Hal)_4$, where "Me" can be independently selected from: copper (Cu), iron (Fe), chromium (Cr), cobalt (Co), nickel (Ni), manganese (Mn), and zinc (Zn); where "E" is selected from: tetraethylammonium (TEA) or tetra-n-butylammonium (TBA), tetrahexylammonium, tetraheptylammonium, tetramethylammonium, tetramethylphosphonium, tetraphenylphosphonium, tetraphenylarsonim, and combinations thereof; and where "Hal" is a halogen group.

An embodiment of a method of removing a contaminant, among others, include: contacting a composition of the present disclosure with the contaminant.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
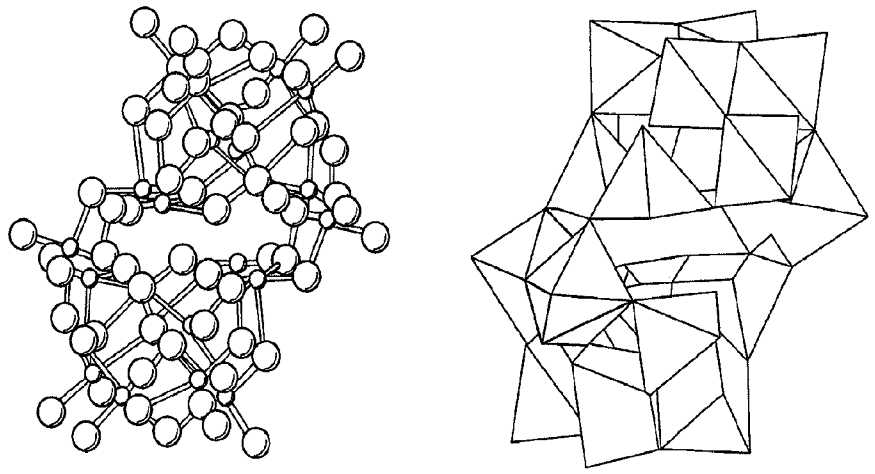
FIG. 1 illustrates the X-ray structure of $Rb_6K_2[Cu_2SiW_8O_{28}(OH)_4]_2$ in atom (ball-and-stick) notation (left) and polyhedral notation (right). The polyanion has $C_i$ symmetry, and all the Cu centers appear to be Cu(II) centers based on BVS calculations. The open coordination position on the Cu centers resides in a space that is probably too sterically hindered for any $NO_x$ ligand to bind.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Discussion

In accordance with the present disclosure, as embodied and broadly described herein, embodiments of this disclosure, in one aspect, relate to compositions, materials incorporating the compositions, and methods of use thereof, for the protection and/or decontamination of contaminants. In an illustrative embodiment, the composition and/or materials can be used in deodorizing sprays, topical skin protectants, coatings for use indoors, fabrics that are not exposed to $H_2O$ (e.g., upholstery, carpeting, and the like), liners for shoes (e.g., running shoes, dress shoes, and the like), coatings for outdoor use (e.g., coatings not exposed to $H_2O$), fabrics for garments that are not washed, filters and filtration systems (e.g., coatings on the fibers of the filter and on portions of the filtration system and/or incorporated in the fibers or fabric of the filter), and other fabrics as well. Embodiments of the compositions may be used in combination with solvents to store and deliver the compositions. It should be noted that "not exposed to $H_2O$" does not mean not exposed to moisture in the air.

In particular, embodiments of the present disclosure include compositions, materials, and the like, that include Me/POM/$NO_x$ (e.g., [MePOM][$NO_x$], or [MePOM$NO_x$]) and Me/POM/$NO_x$:EMe$(Hal)_4$. Each "Me" can independently include, but is not limited to, copper (Cu), iron (Fe), chromium (Cr), cobalt (Co), nickel (Ni), manganese (Mn), and zinc (Zn), or other d-electron-containing transition-metals. In an embodiment, Me is Cu and Fe (e.g., Cu/POM/$NO_x$ and EFe$(Hal)_4$). "E" can include, but is not limited to, tetraethylammonium (TEA) or tetra-n-butylammonium (TBA), tetrahexylammonium, tetraheptylammonium, tetramethylammonium, tetramethylphosphonium, tetraphenylphosphonium, tetraphenylarsonium, related polyalkyl or polyaryl cations, and combinations thereof. "POM" can include polyoxometalates as described in detail below. "Hal" is a halogen (e.g., bromine (Br), chlorine (Cl), fluorine (F), iodine (I), or other monohapto monoanion such as $N_3$, OCN, and the like), and "x" is 1 or 2. It should be noted that in an embodiment $NO_x$ could be replaced by $NO_3^-$ or $NO_2^-$. It should be noted that a notation of $NO_x$ includes [$NO_3^-$] or [$NO_2^-$] for purposes of this disclosure. For embodiments including Me/POM/$NO_x$ and Me/POM/$NO_x$:EMe$(Hal)_4$, the ratio between Me/POM/$NO_x$ and Me/POM/$NO_x$:EMe$(Hal)_4$ can be from about 1:9 to 9:1 (e.g., 1:9 to 8:2, 1:9 to 5:5, and other ratios in increments of 0.1).

It should be noted that embodiments of the present disclosure (e.g., Me/POM/$NO_x$ (e.g., [MePOM][$NO_x$], or [MePOM$NO_x$]) and/or Me/POM/$NO_x$:EMe$(Hal)_4$) may be represented as a mixture of components such as, but not limited to, EMe$(Hal)_4$, E/POM, and Me$(NO_3)_2$. In an embodiment, the mixture may be of $TBAFeBr_4$, $TBA_xPW_{11}O_{39}$, and $Cu(NO_3)_2$. In an embodiment the composition can include a mixture of $TBAFeBr_4$, $TBA_xPW_{11}O_{39}$, and $Cu(NO_3)_2$. The range for $TBAFeBr_4$ is about 10 to 80 weight percent of the composition and about 10 to 50 weight percent of the composition. The range for $TBA_xPW_{11}O_{39}$ is about 82 to 1.8 weight percent of the composition and about 82 to 45 weight percent of the composition. The range for $Cu(NO_3)_2$ is about 8 to 0.2 weight percent of the composition and about 8 to 5 weight percent of the composition. One skilled in the art can determine the composition of the formula in view of the teachings provided herein.

In an embodiment, the compounds or a portion thereof (e.g., POMs) are immobilized on a support $(Si/(ZO_2)^+)$. When used to describe $(Si/(ZO_2)^+)$, "Z" can be a metal or a nonmetal, and "O" is oxygen. "Z" can include metals such as, but not limited to, zirconium, aluminum, aluminum oxide, iron, copper, titanium, and chromium. In addition, "Z" can include titanium oxide. Additional details regarding embodiments of the present disclosure are discussed below.

In an embodiment, the composition can include Cu/POM/$NO_x$ or TBAFe$(Hal)_4$:Cu/POM/$NO_x$, where "Hal" is a halogen (e.g., Br) and the POM can be a POM (e.g., $PW_{11}$, $PW_9$, $SiW_{11}$, $SiW_{10}$, $SiW_9$, $AlW_{11}$, $AsW_{11}$, and related defect ("lacunary") POM units and combinations thereof) with an appropriate amount of oxygen atoms for each (e.g., $[PW_{11}O_{39}]^{7-}$, $[PW_9O_{34}]^{9-}$, $[SiW_{11}O_{39}]^{8-}$, $[SiW_{10}O_{36}]^{8-}$, and $[SiW_9O_{34}]^{10-}$, $[AlW_{11}O_{39}]^{9-}$, and $[AsW_{11}O_{39}]^{7-}$). In particular, the ratio between $TBAFe(Hal)_4$ and Cu/POM/$NO_x$ can be about 1:9 to 9:1 (e.g., 1:9 to 8:2, 1:9 to 5:5, and other ratios in increments of 0.1).

It should be noted that embodiments of the present disclosure that include Cu/POM/$NO_x$ or $TBAFe(Hal)_4$:Cu/POM/$NO_x$ are advantageous because there is no induction period or a short induction period, which is advantageous because the composition and/or material can be effective to decontaminate and/or degrade the contaminants of interest immediately. A short or lack of an induction period can be advantageous in situations where chemical warfare agents, biological warfare agents, or other chemical or biological agents need to be degraded and/or decontaminated very quickly. A short or lack of an induction period can be advantageous in situations where the chemical or biological agent is odoriferous.

The polyoxometalate (POM) can have the general formula of $A[V_kMo_mW_nNb_oTa_pM_qX_rO_s]$. "A" is at least one counterion, which can include, but is not limited to, alkali metal cations, alkaline earth metal cations, ammonium cations, quaternary ammonium cations, d-block cations (groups 3-12 of the periodic table), f-block cations (the lanthanide and actinide series), or combinations thereof. "M" is at least one f- or d-block element having at least one d-electron, except for vanadium, molybdenum, tungsten, niobium, or tantalum. "X" is at least one p-, d-, or f-block element, except for oxygen. In addition, "k" can be from 0 to 30, "m" can be from 0 to 160, "n" can be from 0 to 160, "o" can be from 0 to 30, "p" can be from 0 to 10, "q" can be from 0 to 30, and "r" can be from 0 to 30. In an embodiment, "s" is sufficiently large that "y" is greater than zero. In an embodiment, the sum of "k", "m", "n", "o", and "p" is greater than or equal to four. In an embodiment, the sum of "k", "m", and "q" is greater than zero.

In another embodiment, the polyoxometalate has the formula $[X^{g+}V_bM^{h+}{}_cZ_{12-b-c}O_{40}]^{u-}[A]$. "X" is at least one p-, d-, or f-block element, while "g+" is the charge of X. "M" is at least one f-block element or d-block element having at least one d-electron, where "M" is not vanadium and "h+" is the charge of "M". In reference to the POM formula, "Z" is tungsten, molybdenum, niobium, or a combination thereof. In addition, "b" is from 0 to 6; "c" is from 0 to 6, where the sum of "b" and "c" is greater than or equal to one. Lastly, "u" is greater than 3 and "A" is a counterion.

In another embodiment, the polyoxometalate has the formula $[X^{g+}V_bM^{h+}{}_cZ_{11-b-c}O_{39}]^{u-}[A]$. "X" is at least one p-, d-, or f-block element, while "g+" is the charge of X. "M" is at least one f-block element or d-block element having at least one d-electron, where "M" is not vanadium and "h+" is the charge of "M". In reference to the POM formula, "Z" is tungsten, molybdenum, niobium, or a combination thereof. In addition, "b" is from 0 to 6, "c" is from 0 to 6, where the sum of "b" and "c" is greater than or equal to one. Lastly, "u" is greater than 3 and "A" is a counterion.

In another embodiment, the polyoxometalate has the formula $[X^{g+}V_bZ_{12-b}O_{40}]^{u-}[A]$. "X" is at least one of phosphorus, silicon, aluminum, boron, zinc, cobalt, or iron. In reference to the POM formula, "Z" includes tungsten, molybdenum, niobium, or a combination thereof. In addition, "b" is from 1 to 6 and "u" is greater than 3.

In another embodiment, the polyoxometalate has the formula $[X^{g+}V_bZ_{11-b}O_{39}]^{u-}[A]$. "X" is at least one of phosphorus, silicon, aluminum, boron, zinc, cobalt, or iron. In reference to the POM formula, "Z" includes tungsten, molybdenum, niobium, or a combination thereof. In addition, "b" is from 1 to 6 and "u" is greater than 3.

In another embodiment, the polyoxometalate has the formula $[X^{g+}M^{h+}{}_cZ_{12-c}O_{40}]^{u-}[A]$. "X" is at least one of phosphorus, silicon, aluminum, boron, zinc, cobalt, or iron. In reference to the POM formula, "Z" includes tungsten, molybdenum, niobium, or a combination thereof. In addition, "$M^{h+}$" is at least one f-block element or d-block element having at least one d-electron, while "c" is from 1 to 6 and "u" is greater than 3.

In another embodiment, the polyoxometalate has the formula $[X^{g+}M^{h+}{}_cZ_{11-c}O_{39}]^{u-}[A]$. "X" is at least one of phosphorus, silicon, aluminum, boron, zinc, cobalt, or iron. In reference to the POM formula, "Z" includes tungsten, molybdenum, niobium, or a combination thereof. In addition, "$M^{h+}$" is at least one f-block element or d-block element having at least one d-electron, while "c" is from 1 to 6 and "u" is greater than 3.

In another embodiment, the polyoxometalate has the formula $[X^{i+}{}_2V_uM^{j+}{}_vZ_{18-u-v}O_{62}]^{w-}[A]$. "X" is at least one p-, d-, or f-block element and "i+" is the charge of "X". "M" is at least one d- or f-block element, where "M" is not vanadium. In addition, "j+" is the charge of "M". In reference to the POM formula, "Z" is tungsten, molybdenum, niobium, or a combination thereof. Further, "u" is from 0 to 9, and "v" is from 0 to 9, where the sum of "u" and "v" is greater than or equal to one. Lastly, "w" is greater than or equal to 4 and "A" is a counterion.

In another embodiment, the polyoxometalate has the formula $[X^{i+}{}_2V_uM^{j+}{}_vZ_{17-u-v}O_{61}]^{w-}[A]$. "X" is at least one p-, d-, or f-block element and "i+" is the charge of "X". "M" is at least one d- or f-block element, where "M" is not vanadium. In addition, "j+" is the charge of "M". In reference to the POM formula, "Z" is tungsten, molybdenum, niobium, or a combination thereof. Further, "u" is from 0 to 9 and "v" is from 0 to 9, where the sum of "u" and "v" is greater than or equal to one. Lastly, "w" is greater than or equal to 4 and "A" is a counterion.

In another embodiment, the polyoxometalate has the formula $[X^{i+}{}_2V_uZ_{18-u}O_{62}]^{w-}[A]$. "X" is at least one of phosphorus, sulfur, silicon, aluminum, boron, zinc, cobalt, or iron. In reference to the POM formula, "Z" comprises tungsten, molybdenum, niobium, or a combination thereof. In addition, "u" is from 1 to 9 and "w" is greater than or equal to 4.

In another embodiment, the polyoxometalate has the formula $[X^{i+}{}_2V_uZ_{17-u}O_{61}]^{w-}[A]$. "X" is at least one of phosphorus, sulfur, silicon, aluminum, boron, zinc, cobalt, or iron. In reference to the POM formula, "Z" comprises tungsten, molybdenum, niobium, or a combination thereof. In addition, "u" is from 1 to 9 and "w" is greater than or equal to 4.

In another embodiment, the polyoxometalate has the formula $[X^{i+}{}_2M^{j+}{}_vZ_{18-v}O_{62}]^{w-}[A]$. "X" is at least one of phosphorus, sulfur, silicon, aluminum, boron, zinc, cobalt, or iron. In reference to the POM formula, "Z" comprises tungsten, molybdenum, niobium, or a combination thereof. "$M^{j+}$" is at least one d- or f-block element, while "v" is from 1 to 9 and "w" is greater than or equal to 4.

In another embodiment, the polyoxometalate has the formula $[X^{i+}{}_2M^{j+}{}_vZ_{17-v}O_{61}]^{w-}[A]$. "X" is at least one of phosphorus, sulfur, silicon, aluminum, boron, zinc, cobalt, or iron. In reference to the POM formula, "Z" comprises tungsten, molybdenum, niobium, or a combination thereof. "$M^{j+}$" is at least one d- or f-block element, while "v" is from 1 to 9 and "w" is greater than or equal to 4.

In another embodiment, the polyoxometalate has the formula $[YV_xZ_{12-x}O_{40}][A]$. "Y" is phosphorus, silicon, or aluminum. In reference to the POM formula, "Z" is tungsten or molybdenum. In addition, "x" is from 1 to 6 and "A" is a counterion. In one embodiment, "Y" is phosphorus and "Z" is molybdenum. In one embodiment, "Y" is phosphorus and "Z" is tungsten. In one embodiment, "Y" is silicon and "Z" is molybdenum. In one embodiment, "Y" is silicon and "Z" is tungsten. In one embodiment, "Y" is aluminum and "Z" is tungsten. In one embodiment, "Y" is aluminum and "Z" is molybdenum.

In another embodiment, the polyoxometalate has the formula $[YV_xZ_{11-x}O_{39}][A]$. "Y" is phosphorus, silicon, or aluminum. In reference to the POM formula, "Z" is tungsten or molybdenum. In addition, "x" is from 1 to 6 and "A" is a counterion. In one embodiment, "Y" is phosphorus and "Z" is molybdenum. In one embodiment, "Y" is phosphorus and "Z" is tungsten. In one embodiment, "Y" is silicon and "Z" is molybdenum. In one embodiment, "Y" is silicon and "Z" is tungsten. In one embodiment, "Y" is aluminum and "Z" is tungsten. In one embodiment, "Y" is aluminum and "Z" is molybdenum.

The composition can include the polyoxometalate in about 0.05 to 0.90 weight % of the composition. In particular, the composition can include the polyoxometalate in about 0.10 to 0.15 weight % of the composition.

As indicated hereinabove, an embodiment of the disclosure includes compositions having at least one POM having the general formula of $A[V_kMo_mW_nNb_oTa_pM_qX_rO_s]$ (or any one of the more specific POM formulas) bound to cationic silica (e.g., $(Si/(ZO_2)^+)$. Cationic silica includes, but is not limited to, cationic metal or nonmetal oxide coated colloidal silica particles $((Si/ZO_2)^+)$, where "Si" is silicon, "Z" can a metal or a nonmetal, and "O" is oxygen. "Z" includes metals such as, but not limited to, zirconium, aluminum, aluminum oxide, iron, copper, titanium, and chromium. In addition, "Z" can include titanium oxide. The metal or nonmetal oxide silica surface functions as a cationic site for the negatively charged POMs to bond. Not intending to be bound by any particular theory, the silica and POM can interact synergistically to enhance the catalytic capability of the $POM/(Si/ZO_2)^+$ materials.

In an embodiment, the compositions can be used in solvents such as, but not limited to, non-polar organic solvents, alkanes, low molecular weight fluorocarbons, hydrocarbons, and combinations thereof. In particular, the solvents can include, but are not limited to, petroleum ether, paraffin oil, benzene, toluene, and combinations thereof. Additional solvents can include, but are not limited to, the solvents listed in Table 2 in Example 1.

Some compositions are effective at degrading contaminants such as warfare agents (e.g., chemical and/or biological warfare agents). Not intending to be bound by any particular theory, embodiments of the disclosure may be effective as catalysts with respect to the oxidation of chemical and/or biological warfare agents. In particular, compositions of the present disclosure are effective at oxidizing 2-chloroethyl ethyl sulfide (CEES), a mustard gas stimulant, using oxygen $(O_2)$ or air as the terminal oxidant.

Embodiments of the compositions described herein are capable of degrading a single contaminant or multiple contaminants in an environment. The term "environment" as used herein refers to any media that contains at least one contaminant. For example, in one embodiment, the environment may comprise a liquid phase. In another embodiment, the environment may comprise a gas phase.

The term "degrade" or "degradation" refers to, but is not limited to, the degradation of the contaminant, the conversion of the contaminant into another compound that is either less toxic or nontoxic, or the adsorption of the contaminant by the compositions of the present disclosure. The compositions may be able to degrade the contaminant by a number of different mechanisms. For example, the compositions of the present disclosure can aerobically oxidize the contaminant.

Contaminants that can be degraded by using compositions of the present disclosure include, but are not limited to, chemical warfare agents, biological warfare agents, or combinations thereof. Exemplary chemical warfare agents include mustard gas and sarin, while an exemplary biological warfare agent includes anthrax.

Some of the chemical warfare agents and biological warfare agents disclosed in Marrs, Timothy C.; Maynard, Robert L.; Sidell, Frederick R.; *Chemical Warfare Agents Toxicology and Treatment*; John Wiley & Sons: Chichester, England, 1996; Compton, James A. F.; *Military Chemical and Biological Agents Chemical and Toxicological Properties*; The Telford Press: Caldwell, N.J., 1988; Somani, Satu M.; Chemical Warfare Agents; Academic Press: San Diego, 1992, which are incorporated herein by reference in their entirety, may be degraded by embodiments of the present disclosure.

Furthermore, contaminants that can be degraded by using embodiments of the present disclosure generally include, but are not limited to, the following: aldehydes, aliphatic nitrogen compounds, sulfur compounds, aliphatic oxygenated compounds, halogenated compounds, organophosphate compounds, phosphonothionate compounds, phosphorothionate compounds, arsenic compounds, chloroethyl compounds, phosgene, cyanic compounds, or combinations thereof. In one embodiment, the contaminant is acetaldehyde, methyl mercaptan, ammonia, hydrogen sulfide, diethyl sulfide, diethyl disulfide, dimethyl sulfide, dimethyl disulfide, trimethylamine, styrene, propionic acid, n-butyric acid, n-valeric acid, iso-valeric acid, pyridine, formaldehyde, 2-chloroethyl ethyl sulfide, carbon monoxide, or combinations thereof.

Compositions of the present disclosure are typically used in the presence of an oxidizer to degrade a contaminant from the environment. An example of an oxidizer includes, but is not limited to, dioxygen. In a preferred embodiment, oxygen present in the air is used as the oxidizer.

Compositions of the present disclosure can be incorporated into a suitable material in order to facilitate the protection and/or degradation of a contaminant. The materials may include, for example, topical carriers, coatings, powders, filter materials, and/or fabrics, for example. A material as used herein refers to a media that incorporates one or more of the compositions of the present disclosure.

Some compositions can be incorporated into the material using techniques known in the art. In one embodiment, when the material is a topical carrier, powder, filter material, fabric or coating, the composition is directly added to and admixed with the material. In one embodiment, the components of the composition can be incorporated sequentially into the material. In another embodiment, the material is contacted with a composition comprising the composition and a solvent. The composition can be soluble, partially soluble, or insoluble in the solvent, depending upon the components of the composition and the solvent selected. In one embodiment, the solvent is water. In another embodiment, the solvent can be an organic solvent. Examples of solvents useful in embodiments of the present disclosure include, but are not limited to, acetonitrile, toluene, carbon dioxide, xylenes, 1-methyl-2-pyrrolidinone, or fluorinated media such as perfluoropolyether compounds.

The amount of each composition incorporated into the material varies, depending, at least in part, upon the contaminant to be degraded and the material that is selected. There is little restriction on the amount of each composition that can be incorporated into the material. In one embodiment, the composition incorporated in the material is from 0.1 to 95% by weight of the material. In one embodiment, the lower limit of composition by weight maybe 0.05, 0.1, 0.5, 1.0, 2.0, 5.0, 10, 15, 20, 25, 30, 35, 40, 45, or 50%, and the upper limit maybe 30, 40, 50, 60, 70, 80, 90, or 95%. In one embodiment, when the material is a topical carrier, the composition is from 1 to 50% by weight of topical composition.

Compositions of the present disclosure can be used in a wide variety of topical carriers. Suitable topically acceptable pharmaceutical carriers are those which typically are used in the topical application of pharmaceuticals and cosmetics. Examples of such carriers include, but are not limited to, lotions, creams, ointments, and gels. In some applications, topical carriers can be referred to as barrier creams and topical skin protectants. Any of the topical carriers disclosed in U.S. Pat. Nos. 5,607,979, 6,410,603, 6,713,076, and 7,097,858, each of which are incorporated by reference in its entirety, can be used in some of the embodiments of the present disclosure. In one embodiment, the topical carrier comprises a perfluorinated media (e.g., a polymer or a mixture of polymers). In another embodiment, the topical carrier comprises perfluoropolyether compounds. An example of a perfluoropolyether (PFPE) compound useful in the present disclosure has the general formula $CF_3O[—CF(CF_3)CF_2O—]_x(—CF_2O—)_y CF_3$. Examples of PFPE media include Fluorolink®, Galden®, and Fomblin®, for example, from the Ausimont Montedison Group. In one embodiment, the topical carrier comprises a perflourinated polymer and one or more unfluorinated polymers or compounds. In another embodiment, the topical carrier comprises a perfluoropolyether and one or more unfluorinated polyethers.

In one embodiment, the topical carrier may further contain saturated or unsaturated fatty acids such as stearic acid, palmitic acid, oleic acid, palmito-oleic acid, cetyl or oleyl alcohols, stearic acid, fluorinated acids, fluorinated alcohols, or combinations thereof. The cream may also optionally contain one or more surfactants, such as a non-ionic surfactant.

A wide variety of powders and coatings (e.g., thermoplastics and thermosettings) known in the art can be used as the material in embodiments of the present disclosure. In one embodiment, the powder comprises activated carbon.

Almost any fabric can be developed to include one or more of the compositions. In one embodiment, fabrics used to prepare garments, draperies, carpets, and upholstery can be used, and articles made from them are a part of this disclosure. In another embodiment, the fabric can be a knit or non-woven fabric. Useful fibers include, but are not limited to, polyamide, cotton, polyacrylic, polyacrylonitrile, polyester, polyvinylidine, polyolefin, polyurethane, polyurea, polytetrafluoroethylene, or carbon cloth, or a combination thereof. In still another embodiment, the fabric is prepared from cotton, polyacrylic, or polyacrylonitrile. In still another embodiment, the fabric is prepared from a cationic fiber. In another embodiment, the fabric comprises (1) a 50/50 blend of nylon-6, 6 and cotton or (2) stretchable carbon blended with polyurethane or polyurea.

Further, any cellulosic fiber can incorporate the mixtures of the present disclosure. Examples of useful cellulosic fibers include, but are not limited to, wood or paper.

In one embodiment, when the material is a fabric or cellulosic fiber, the composition is from about 0.1 to about 20% by weight of the material and from initially about 80 to about 99.9% by weight water, preferably from about 0.3 to about 15% by weight composition and initially 85 to 99.7% by weight water. Generally, the fabric or cellulosic fiber is dipped or immersed into the composition from several hours up to days at a temperature of from about 0° C. to 100° C., preferably for 2 hours to 2 days at from about 25° C. to 80° C. In another embodiment, the composition can be admixed with a resin or adhesive, and the resultant adhesive is applied to the surface of, or admixed with, the fabric or cellulosic fiber.

Typically, once the material has been contacted with the composition, the composition is dried in order to remove residual solvent. In one embodiment, the composition is heated from about 0° C. to 220° C. at or below atmospheric pressure, preferably from about 25° C. to 100° C. In another embodiment, the composition is dried in vacuo (i.e., less than or equal to about 10 torr).

In another embodiment, when the material is a fabric or cellulosic fiber, the composition can be incorporated into the fabric or cellulosic fiber by depositing the composition on the surface of an existing fabric or cellulosic fiber, covalently bonding the components of the composition to the fibers of the fabric or cellulosic fiber, impregnating or intimately mixing the composition with the fabric or cellulosic fiber, electrostatically bonding the components of the composition to the fabric or cellulosic fiber, or datively bonding the components of the composition to the fabric or cellulosic fiber.

Embodiments of the compositions of the present disclosure have a number of advantages over the prior art decontaminants. One advantage is that the compositions of the present disclosure can catalytically degrade a contaminant from the environment starting within milliseconds of contact and can degrade the contaminant for extended periods of time, ranging from several days to indefinitely. Another advantage is that some compositions can render the material more water-resistant and increase the surface area of the material. Finally, when the material is a fabric or cellulosic fiber, the composition can enhance the dyeability, light fastness, color fastness, and weaving properties of the fabric or cellulosic fiber.

The following describe an illustrative method for making POMs.

General Methods and Materials $TBA_9[A\text{-}PW_9O_{34}]$ or $Na_9[A\text{-}PW_9O_{34}]$ were prepared by the literature methods. $FeBr_3$, $Cu(NO_3)_2.2.5H_2O$, $Fe(NO_3)_3.9H_2O$, TBABr, $TBANO_3$, acetonitrile, o-toluenesulfonic acid (TsOH), 1,3-dichlorobenzene and 2-chlorethyl ethyl sulfide (CEES) were purchased from Aldrich and used without further purification.

The chemical species were identified and quantified by gas chromatography (GC; Hewlett Packard 5890 series gas chromatograph equipped with a flame ionization detector, 5% phenyl methyl silicone capillary column, $N_2$ carrier gas, and a Hewlett Packard 3390A series integrator).

Preparation of an Embodiment of a Catalyst

To an aqueous solution of $Na_9[A\text{-}PW_9O_{34}]$, a saturated aqueous solution of XBr (X=tetrabutylammonium, tetrahexylammonium, tetraheptylammonium, tetramethylammonium, tetramethylphosphonium, and the like) is added with stirring. A precipitate forms in rapid succession and is collected and dried. In cases where XBr is insoluble in water, liquid-liquid extraction is employed to isolate the product followed by subsequent evaporation of the organic layer. The product is identified as $X_7[A\text{-}PW_{11}O_{34}]$. To a solution of $X_7[A\text{-}PW_{11}O_{34}]$ in acetonitrile, is added an acetonitrile solution of $Y(NO_3)_z$ [Y=d or f block transition metal, Z=charge of Y cation, in an embodiment it is $Cu(NO_3)_2$ or $Fe(NO_3)_3$]. The mixture is stirred until the solvent is evaporated, washed with acetonitrile on the filter, and dried in air. The product is identified as $X_w[A\text{-}YPW_{11}O_{34}]$.

Molar equivalents of $FeBr_3$ and XBr (X is defined above) are dissolved in acetonitrile. The resulting solution is allowed to evaporate, and a dark brown solid is collected. The solid is redissolved in a minimal amount of acetonitrile and recrystallized by slow ether diffusion. The resulting compound is identified as $XFeBr_4$, a tetrabromoferrate derivative.

The catalyst is a 1:1 mechanical mixture of the above 2 compound, and is used without further purification. Standard oxidation procedure involves combining catalyst, target, and internal standard in a solvent (see list) and monitoring the resulting reaction via gas chromatography.

It should be noted that other POMs such as those described in the formulas described above could be made following similar methods of preparation.

Example 1

The present disclosure describes methods to prepare supported polyoxometalate (POM) catalysts. This new synthetic protocol is significant because it provides far more active catalysts for aerobic oxidations, as exemplified by the oxygenation of sulfides to sulfoxides, eq. 1, than supported polyoxometalate catalysts prepared by previous and conventional routes. The latter entail initial POM synthesis and purification followed by immobilization of the POM on the support. These heterogeneous oxygenation catalysts via in situ POM self assembly involve POMs that have nitrate and bromide terminally coordinated to d-electron containing metals in surface sites of the POMs.

$$R_2S+\frac{1}{2}O_2 \rightarrow R_2SO \quad (1)$$

The supports can be selected from a wide array of materials, including carbon, cationic silica $(Si/(ZO_2)^+$, Z=Al, Fe, Zr, Ti), $TiO_2$, and $Al_2O_3$, and they can be porous or nonporous. The catalysts are formed under the ambient conditions and comprise $H_X[A\text{-}\alpha\text{-}(Fe(NO_3))(FeBr)PW_{11}O_{39}]^{-(3-X)}$, a new highly active homogeneous catalyst disclosed earlier, or $H_X[A\text{-}\alpha\text{-}(Cu(NO_3))(FeBr)PW_{11}O_{39}]^{-(4-X)}$, a material recently found to be a particularly reactive homogeneous catalyst for sulfide oxidation. These materials are referred to henceforth as "$Fe/PW_{11}/Br/NO_3/C$", "$Fe/PW_{11}/Br/NO_3/AlO_2$", "$Fe/PW_{11}/Br/NO_3/TiO_2$", "$Fe/PW_{11}/Br/NO_3/Si/AlO_2$", or "$Fe/PW_{11}/Br/Cu/NO_3/C$", "$Fe/PW_{11}/Br/Cu/NO_3/AlO_2$", "$Fe/PW_{11}/Br/Cu/NO_3/TiO_2$" and "$Fe/PW_{11}/Br/Cu/NO_3/Si/AlO_2$" accordingly. The resulting self-assembled heterogeneous catalysts for sulfide oxidation or mustard (HD) decontamination can be easily recycled after use.

It has been demonstrated that these materials comprised of POMs prepared in situ on various supports are the most effective heterogeneous catalysts yet for the oxidative decontamination (selective sulfoxidation) of 2-chlorethyl ethyl sulfide (CEES), the optimal simulant for HD, and HD itself. HD is the most abundant chemical warfare agent (CWA). These catalysts require only the $O_2$ in air as the oxidant under ambient conditions to convert HO to the corresponding sulfoxide, eq 2 (no heat, light, solvents, additives or other requirements are needed for activity).

$$(ClCH_2CH_2)_2S(\text{or "HD"})+\frac{1}{2}O_2 \rightarrow (ClCH_2CH_2)_2SO(\text{or "HDO"}) \quad (2)$$

Their selectivity for sulfoxide is effectively quantitative (100%; no overoxidation to the toxic sulfone $(ClCH_2CH_2)_2SO_2$ (or "$HDO_2$") is observed). The sulfoxide of mustard, HDO, is the most attractive decontamination target of HD (of many possibly oxidative and hydrolytic decomposition products), with the exception of the products of total mineralization ($CO_2$, $H_2O$, and $S_8$). Finally, the stability of the all these new heterogeneous catalysts is high.

The catalysts are prepared in three steps. Below is an exemplary self-assembly synthesis, that for $H_X[A\text{-}\alpha\text{-}(Cu(NO_3))(FeBr)PW_{11}O_{39}]^{-(4-X)}$ on a carbon surface.

$\alpha\text{-}Na_8W_9O_{34}.7H_2O$ was prepared by the literature method (Massart, R., Contant, R., Fruchart, Jean-Marc, Ciabrini, Jean-Pierre and Fournier, M. *Inorg. Chem.* 1977, 16, 2916-2921; Domalle, P. *Inorganic Synth.* 1990, 27, 96-104).

Step 1.

To a solution of $Na_8HPW_9O_{34}$—$H_2O$ (3.5 g; 0.0012 mol) in water (350 mL) are added carbon beads at once with stirring (31.5 g; Gentex carbon beads were used as received). Mixture is stirred overnight at ambient temperature, washed with water on the filter and dried in air. The amount of $Na_8HPW_9O_{34}$ bound to the surface is determined by subtracting the amount of POM (mmol) precipitated by addition of TBABr to a supernatant and the water collected after washing the beads, from the amount of POM used in the reaction. The resulting product (henceforth referred to as "$PW_{11}/C$") contains 0.099 g or 0.034 mmol of bound POM per 1 g of carbon.

Step 2.

To $PW_{11}/C$ (1.0 g; 0.034 mmol POM) suspended in 10 mL of acetonitrile is added $FeBr_3$ (0.1 g. 0.28 mmol) dissolved in 1.0 mL of acetonitrile. The mixture is stirred in air until all solvent is evaporated. The resulting solid is washed with acetonitrile on the filter and air dried. This product is referred to henceforth as "$FePW_{11}/Br/C$".

Step 3.

To $FePW_{11}/Br/C$ (1 g; 0.034 mmol of $PW_9$) suspended in 10 mL of acetonitrile is added solid $Cu(NO_3)_2.nH_2O$ (0.042 g 0.10 mmol). The mixture is stirred until all solvent is evaporated in air, washed with acetonitrile on the filter, and air dried. The resulting product is referred to henceforth as "$Fe/PW_{11}/Br/Cu/NO_3/C$"

Analogous procedures are used for preparation of all other catalysts on aluminum modified cationic silica $(Si/(AlO_2)^+$, $TiO_2$, and $Al_2O_3$.

In a typical CEES sulfoxidation reaction, 0.130 g of "$Fe/PW_{11}/Br/NO_3/C$", "$Fe/PW_{11}/Br/NO_3/AlO_2$", "$Fe/PW_{11}/Br/NO_3/TiO_2$", "$Fe/PW_{11}/Br/NO_3/Si/AlO_2$", "$Fe/PW_{11}/Br/Cu/NO_3/C$", "$Fe/PW_{11}/Br/Cu/NO_3/AlO_2$", "$Fe/PW_{11}/Br/Cu/NO_3/TiO_2$" or "$Fe/PW_{11}/Br/Cu/NO_3/Si/AlO_2$" was weighed out into 20-mL vials and suspended in 2.3 mL of $CH_3CN$ then, 0.095 mL 1,3-dichlorobenzene (GC internal standard) was added to the vials, and they were sealed. After stirring for 1-20 min, 0.105 mL of CEES was added via syringe to a vial fitted with a PTFE septum. Air access during the experiment was provided through a needle in the cap. The reaction was monitored for 20-24 hrs. Aliquots were analyzed by gas chromatography (GC) every 15 min.

Gas chromatographic analyses were performed on an HP5890 gas chromatograph equipped with a FID detector and a 5% phenyl methyl silicone capillary column. Mass abundance determinations were performed using a HP 5890 GC with a 5% phenyl methyl silicone capillary column and a 5971A mass selective detector. Results of the catalytic experiments (and control reactions) are summarized in Table 1.

TABLE 1

Aerobic Oxidation of 2-Chloroethyl Ethyl Sulfide (CEES) in Acetonitrile by Nitrate and Bromide-containing Polyoxometalate (POM)-based Heterogeneous Catalysts[a]

| Catalyst | [catalyst] (g)[b] | [POM] (mmol)[c] | % conv.[d] | TON[e] |
|---|---|---|---|---|
| $TBA_{5-x}H_x(Fe(NO_3))(A\text{-}\alpha\text{-}PW_{11}O_{39})$ ($TBA_{5-x}$1) | 0.020 | 0.005 | 56 | 98 |
| $TBA_{6-x}H_x(Cu(NO_3))(A\text{-}\alpha\text{-}PW_{11}O_{39})$ ($TBA_{6-x}$2) | 0.024 | 0.005 | 32 | 56 |

TABLE 1-continued

Aerobic Oxidation of 2-Chloroethyl Ethyl Sulfide (CEES) in Acetonitrile by Nitrate and Bromide-containing Polyoxometalate (POM)-based Heterogeneous Catalysts[a]

| Catalyst | [catalyst] (g)[b] | [POM] (mmol)[c] | % conv.[d] | TON[e] |
|---|---|---|---|---|
| $TBA_{5-x}H_x$(FeBr)(A-α-$PW_{11}O_{39}$) ($TBA_{5-x}$3) | 0.014 | 0.003 | 0 | 0 |
| $TBA_{5-x}$1 + $TBA_{5-x}$3[f] | 0.034 | 0.005[g] | 60 | 105 |
| $TBA_{6-x}$2 + $TBA_{5-x}$3[f] | 0.038 | 0.005[h] | 75 | 131 |
| Carbon (C)[i] | 0.130 | 0 | 0 | 0 |
| (1 + 2)/C[j] | 0.130 | 0.004[k] | 0 | 0 |
| (2 + 3)/C[l] | 0.130 | 0.004[k] | 0 | 0 |
| 3/C[m] | 0.130 | 0.004[k] | 0 | 0 |
| Fe/$PW_{11}$/Br/$NO_3$/C[n] | 0.130 | 0.004[k] | 45 | 98 |
| $FePW_{11}$/Br/Cu/$NO_3$/C[n] | 0.130 | 0.004[k] | 48 | 105 |
| Alumina ($Al_2O_3$)[o] | 0.130 | 0 | 0 | 0 |
| (1 + 2)/$Al)_2$[j] | 0.130 | 0.004[k] | 0 | 0 |
| (2 + 3)/$AlO_2$[l] | 0.130 | 0.004[k] | 0 | 0 |
| 3/$AlO_2$[m] | 0.130 | 0.004[k] | 0 | 0 |
| Fe/$PW_{11}$/Br/$NO_3$/$AlO_2$[n] | 0.130 | 0.004[k] | 20 | 44 |
| $FePW_{11}$/Br/$NO_3$/$AlO_2$[n] | 0.130 | 0.004[k] | 22 | 48 |
| Titania ($TiO_2$)[p] | 0.130 | 0 | 0 | 0 |
| (1 + 2)/($TiO_2$)[j] | 0.130 | 0.004[k] | 0 | 0 |
| (2 + 3)/($TiO_2$)[l] | 0.130 | 0.004[k] | 0 | 0 |
| 3/($TiO_2$)[m] | 0.130 | 0.004[k] | 0 | 0 |
| $FePW_{11}$/Br/$NO_3$/$TiO_2$[n] | 0.130 | 0.004[k] | 30 | 66 |
| $FePW_{11}$/Br/Cu/$NO_3$/$TiO_2$[n] | 0.130 | 0.004[k] | 30 | 66 |
| CAT (Si/$AlOH_2$)[r,s] | 0.130 | 0 | 0 | 0 |
| (1 + 2)/Si/$AlOH_2$)[j,s] | 0.130 | 0.004[k] | 0 | 0 |
| (2 + 3)/Si/$AlOH_2$)[l,s] | 0.130 | 0.004[k] | 0 | 0 |
| 3/Si/$AlOH_2$[m] | 0.130 | 0.004[k] | 0 | 0 |
| $FePW_{11}$/Br/$NO_3$/Si/$AlO_2$[n,s] | 0.130 | 0.004[k] | 45 | 98 |
| $FePW_{11}$/Br/Cu/$NO_3$/Si/$AlO_2$[n,s] | 0.130 | 0.004[k] | 43 | 94 |

[a]General conditions: 0.875 mmol (0.35 M) of CEES, catalyst (quantity of carbon supported given in column 2, estimated amount of bonded POM given in column 3), 1 atm of air, 0.876 mmol (0.35 M) of 1,3-dichlorobenzene (internal standard) were stirred in 2.5 mL of acetonitrile at 25° C. for 20 h in the 20-mL vial; no product was observed in the absence of POM, or other catalysts;

[b]g of total catalyst present during turnover;

[c]estimated amount of POM (mmol) bound to the support;

[d]% conversion = (moles of CEES consumed/moles of initial CEES) × 100 at 100% selectivity;

[e]turnovers = moles of CEESO/moles of POM;

[f]1 = ($H_x$(Fe($NO_3$)) $PW_{11}O_{39}]^{-(5-x)}$, 2 = [$H_x$(Cu($NO_3$)) $PW_{11}O_{39}]^{-(6-x)}$, 3 = ($H_x$(FeBr) $PW_{11}O_{39})^{-(5-x)}$, [1]: [3] = [2]: [3] = 1.5;

[g,h]concentrations of 1 and 2 accordingly;

[i]carbon beads from Gentex Corporation;

[j,l,m]POM adsorbed on the surface of substrate from acetonitrile solutions of 1, 2 and 3 accordingly;

[k]estimated total amount of catalyst on substrate;

[n]catalysts were prepared by in situ self assembly of the POM on the support surface;

[o]alumina received from Gentex Corporation;

[p]titania received from Gentex Corporation;

[s]alumina-modified silica received as a colloidal suspension (Bindzil CAT ™ ) from AKZO Nobel.

"Fe/$PW_{11}$/Br/$NO_3$C", "Fe/$PW_{11}$/Br/$NO_3$/$AlO_2$", "Fe/$PW_{11}$/Br/$NO_3$/$TiO_2$", "Fe/$PW_{11}$/Br/$NO_3$/Si/$AlO_2$", "Fe/$PW_{11}$/Br/Cu/$NO_3$/C", "Fe/$PW_{11}$/Br/Cu/$NO_3$/$AlO_2$", "Fe/$PW_{11}$/Br/Cu/$NO_3$/$TiO_2$", "Fe/$PW_{11}$/Br/Cu/$NO_3$/Si$AlO_2$" and like catalysts should be amenable to incorporation into coatings, paints, fabrics (including battle dress uniforms or "BDUs"), cosmetics (including topical skin protectants or "TSPs" in development by the Army) and filter elements. It is anticipated that some of these catalysts, and certainly the Cu(II) salts of them, should also catalytically degrade the organophosphorus nerve agents (e.g., GB (Sarin), GD (Soman), VX) and insecticides such as malathion. This activity has not yet been assessed with the title catalysts because nearly all POM-based catalysts can be teamed with other catalytic decontaminants of the nerve agents without antagonistic (inactiviating) chemical interactions, and thus it is easiest to simply mix the two types of catalysts together for an effective decontaminating formulation.

In addition, there are a host of toxic industrial chemicals (TICs) that should also be amenable to oxidative deactivation/decontamination in the presence of air and the title catalysts. These include $H_2S$, other sulfur compounds and aldehydes. Many POM-based catalysts with similar structural and electronic features to $H_X$[A-α-(Fe($NO_3$))(FeBr)$PW_{11}O_{39}]^{-(3-X)}$ and $H_X$(A-α-(Cu($NO_3$))(FeBr)$PW_{11}O_{39}]^{-(4-X)}$ have catalytic oxidative activities.

Thus these catalysts should have utility in and relevance to civilian markets as well military ones.

Example 2

This example describes isolation of Cu-containing POMs related to the most active POM-based aerobic decontamination catalysts.

Structural characterization of some Cu-containing POMs that relate to the most active POM containing aerobic oxidation catalysts Experimental Section Synthesis of $Rb_6K_2[Cu_2SiW_8O_{28}(OH)_4]_2$ (1) A 0.25 g (1.33 mmol) sample of $Cu(NO_3)_2$ was dissolved with stirring in 20 mL of de-ionized water. The gamma isomer of $K_8[SiW_{10}O_{36}]$.12$H_2O$ (1.0 g, 0.33 mmol) was then added. The solution was stirred for 10 min, and the remaining undissolved material was removed using a medium frit. To the filtrate, 2 mL of 0.5 M aqueous RbCl was added dropwise. The solution was allowed to sit exposed to the air overnight. A pale blue precipitate appeared which was separated by filtration. The collected precipitate was resuspended in 10 mL of de-ionized water and the mixture stirred at 60° C. for 5 h. The resulting solution was filtered after it had cooled. The filtrate was placed in a 25-mL beaker exposed to air for weeks to afford diffraction-quality pale green crystals.

Synthesis of the K salt of $[Cu(Cu_6Si_2W_{16}O_{69})^2]^{42-}$ (2) To a 4-mL vial was added 2.5 mL of an acetonitrile solution containing 0.25 g (1.33 mmol) of $Cu(NO_3)_2$. The vial was then re-filled with distilled water. A 0.5 g (0.16 mmol) sample of gamma-$K_8[SiW_{10}O_{36}]$.12$H_2O$ was dissolved in 8 mL of distilled water, and the solution was transferred to a 15 mL vial. The 4 mL vial containing $Cu(NO_3)_2$ was placed into a larger vial, and distilled water was added slowly to the larger vial until the two solutions just contacted each other. Green needle-like crystals appeared on the outside of the small vial after 3 days, and diffraction-quality green plate crystals appeared at the top of the small vial after one week.

Results

Figure 2:
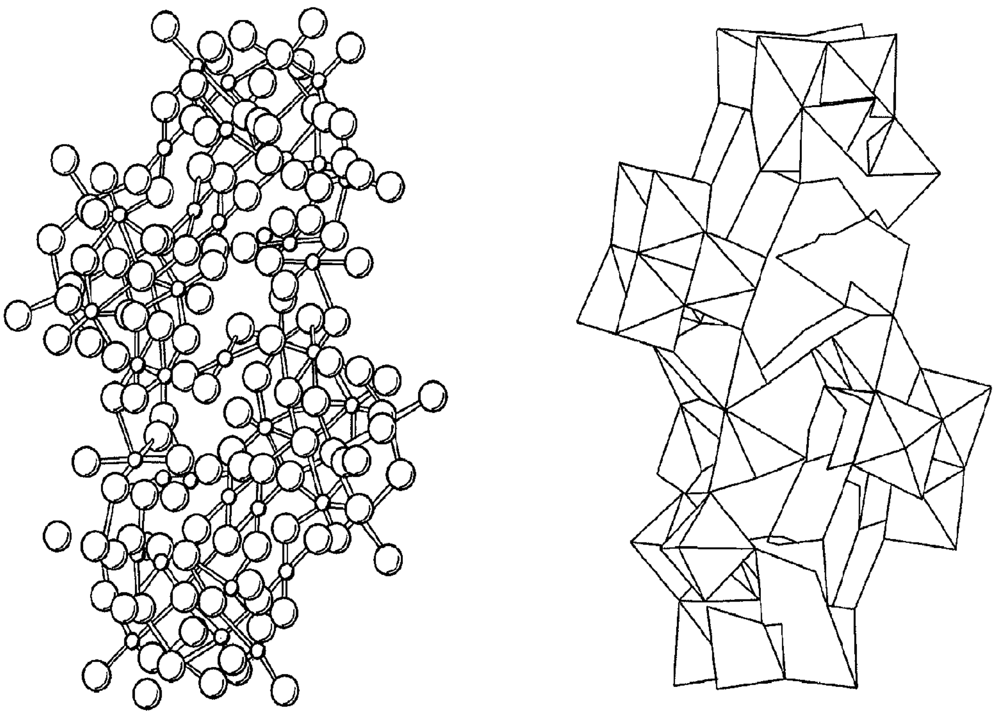
FIG. 2 illustrates the X-ray structure of the K salt of $[Cu(Cu_6Si_2W_{16}O_{69})_2]^{42-}$ in atom (ball-and-stick) notation (left) and polyhedral notation (right). The polyanion has $C_{2h}$ symmetry and a remarkable 5 different structural types of Cu sites. All the Cu centers appear to be Cu(II) centers based on BVS calculations. Clearly at least two of the Cu sites and possibly three could bind $NO_x$, CEES, and other ligands.

The X-ray structures of the $Rb_6K_2[Cu_2SiW_8O_{28}(OH)_4]_2$ (1) and K salt of $[Cu(Cu_6Si_2W_{16}O_{69})_2]^{42-}$ (2) are shown in FIGS. 1 and 2, respectively. Both complexes have structures that are believed to be unprecedented in polyoxometalate (POM) chemistry. Structure 1 has $C_i$ symmetry, and two types of Cu site; structure 2 has $C_{2h}$ symmetry and a remarkable 5 types of Cu sites. The two types of Cu site in 1 have a free coordination position, but it resides in a pocket that is so sterically congested that only single atom ligands, such as bromide, could bind there. In contrast, three of the five types of Cu sites in 2 have free and fairly unencumbered coordination positions. With the current R values of these X-ray structures, it is believed that all the Cu centers in both 1 and 2 are Cu(II), not Cu(I), centers.

Preparation of POM-Impregnated Amberlite Resin

The activity of the $Fe^{3+}$—$Cu^{2+}$-POM catalyst has been studied when supported on Amberlite polymer-based anion exchange resin. In early attempts at preparing this supported catalyst, it was found that the $Na_9PW_9O_{34}$ starting material had a high affinity for the anion exchange resin. In fact, initial attempts at supporting the POM resulted in very high loadings of the catalyst precursor on the support (~30% loading by mass). The resultant catalyst showed no activity, and it is believed that this lack of activity was due to the support having a low internal surface area because the high loading of catalyst clogged the pores. In this series of experiments, the Amberlite-supported catalyst has been prepared at lower overall loadings. The catalyst was assembled by a stepwise process. First, the Amberlite was treated with an aqueous solution of $Na_9PW_9O_{34}$, resulting in an ion exchange process that gave between 5-8% loading of the POM on the support by mass. This product was treated with an acetonitrile solution of $FeBr_3$, followed by an acetonitrile solution of $Cu(NO_3)_2$. Next, the catalytic activity of the supported catalyst was studied at these lower loadings towards aerobic oxidation of CEES, an HD simulant.

Preparation of the Supported Catalyst:

Three 1 g quantities of Amberlite were treated with varying concentrations of $Na_9PW_9O_{34}$ in water (10 mL total volume) in 40 mL vials. A control experiment was also run, where 1 g of Amberlite was treated with neat water. The quantities are shown below in Table 1. The mixtures were stirred for 5 h, after which the excess solution was removed via pipette. The Amberlite was then washed with water (3×) and with acetone (3×). After air-drying, the solids were dried in vacuo for 5 h. All of the products lost a significant portion of their starting weight. This is because the material off-the-shelf is slightly wet, and it loses weight either in the acetone washing or the drying process. The POM loading on the support was determined by comparing the percent mass-loss of the Amberlite samples that were treated with the $Na_9PW_9O_{34}$ salt to the percent mass-loss of the Amberlite used in the control experiment. In prior experiments, it was found that this method gave accurate measures of the POM loading on Amberlite by comparing its results to TGA measurements. At this stage the Amberlite beads were pale yellow. The treatment with $Na_9PW_9O_{34}$ caused no significant color change.

Table 1 of Example 2 shows results on the ion exchange of $Na_9PW_9O_{34}$ with the chloride anions in Amberlite. The % mass loading of the POM on the support was determined by comparing the % weight change of the support compared to that of the control. Entries 1 and 2 showed a significant mass gain compared to the control (entry 4), whereas entry 3 showed a negligible change in the mass of the Amberlite versus the control.

Table 1 of Example 2

| Entry | Mass Amberlite, g | Mass $Na_9PW_9O_{34}$, g | Mass Product, g | Increase vs. Control | % POM Loading |
|---|---|---|---|---|---|
| 1 | 1.0645 g | 0.2128 | 0.6373 | 0.0482 g | 8.2% |
| 2 | 1.0109 | 0.1043 | 0.5901 | 0.0324 | 5.5% |
| 3 | 1.0419 | 0.0498 | 0.5722 | −0.0043 | ~0% |
| 4 | 1.0607 | 0 | 0.5868 | — | 0%-Control |

Table 2 of Example 2. Results on the catalytic aerobic oxidation of CEES by the Amberlite-supported POM catalyst in acetonitrile.

Table 2 of Example 2

| Entry | Catalyst loading | mmol Catalyst | mmol CEES | Time | CEES Conversion | Turnovers |
|---|---|---|---|---|---|---|
| 1 | 8.2% | 0.00609 | 0.0927 | 2 h | 78.7% | 12.0 |
| | | | | 3 d | 100% | 15.2 |
| 2 | 8.2% | 0.00580 | 0.0905 | 2 h | 85.4% | 13.3 |
| | | | | 3 d | 100% | 15.6 |
| 3 | 5.5% | 0.00380 | 0.0909 | 2 h | 55.2 | 13.2 |
| | | | | 3 d | 100% | 23.9 |
| 4 | 5.5% | 0.00405 | 0.0897 | 3 d | 100% | 22.2 |
| 5 | Control | 0 | 0.0910 | 3 d | 0% | — |

Next, the two higher-loaded supports (entries 1 and 2 in Table 1) were treated with a solution of $FeBr_3$ (100 mg) in acetonitrile (5 mL). Because the loading of $Na_9PW_9O_{34}$ was so low in entry 3, it was no longer used. The solution was dark red. The mixture was stirred overnight. In the morning, most of the color in the solution was discharged; the solution was now yellow, and the Amberlite beads were dark red. The supernatant was removed, and the beads were washed with acetonitrile (5×) and dried in vacuo.

Finally, the two sets of beads were treated with a solution of $Cu(NO_3)_3$ (100 mg) in acetonitrile (5 mL). The supernatant was initially blue in each of the mixtures, but after stirring overnight, the solution was light green. The beads remained dark red. The supernatant was removed, and the beads were washed with acetonitrile (5×) and dried in vacuo.

Catalytic CEES Oxidation

Figure 3A:
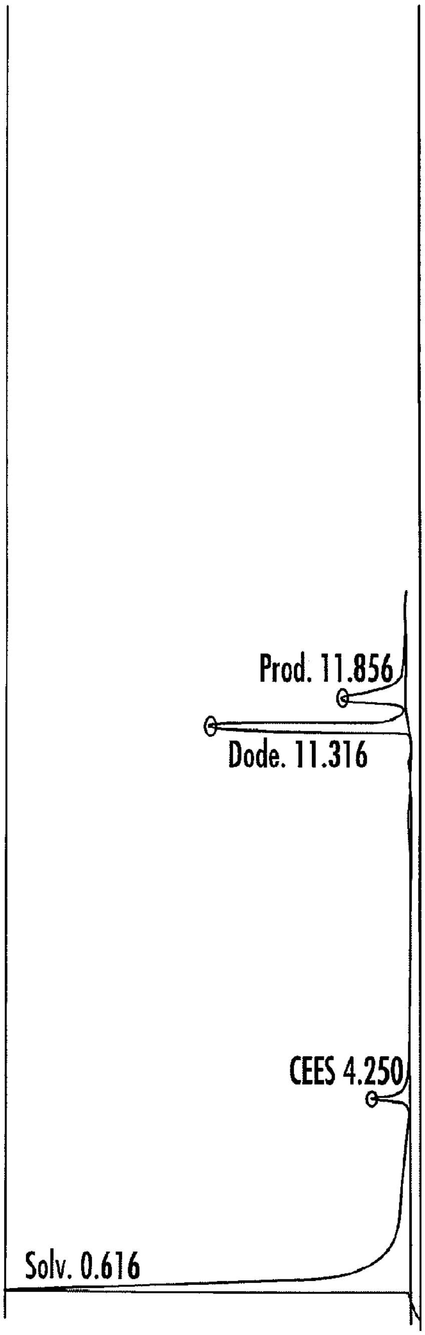
FIGS. 3A and 3B illustrates gas chromatographs of Sample 1 after 2 h of reaction (top, FIG. 3A) and after 3 days (bottom, FIG. 3B). The first peak is the solvent (acetonitrile), the second is unreacted CEES, the third is dodecane (internal standard), and the fourth peak is the oxidation product, CEESO. After 3 days of reaction, the CEESO concentration has dropped; the transient appearance of CEESO has been observed in solution experiments as well.
Figure 3B:
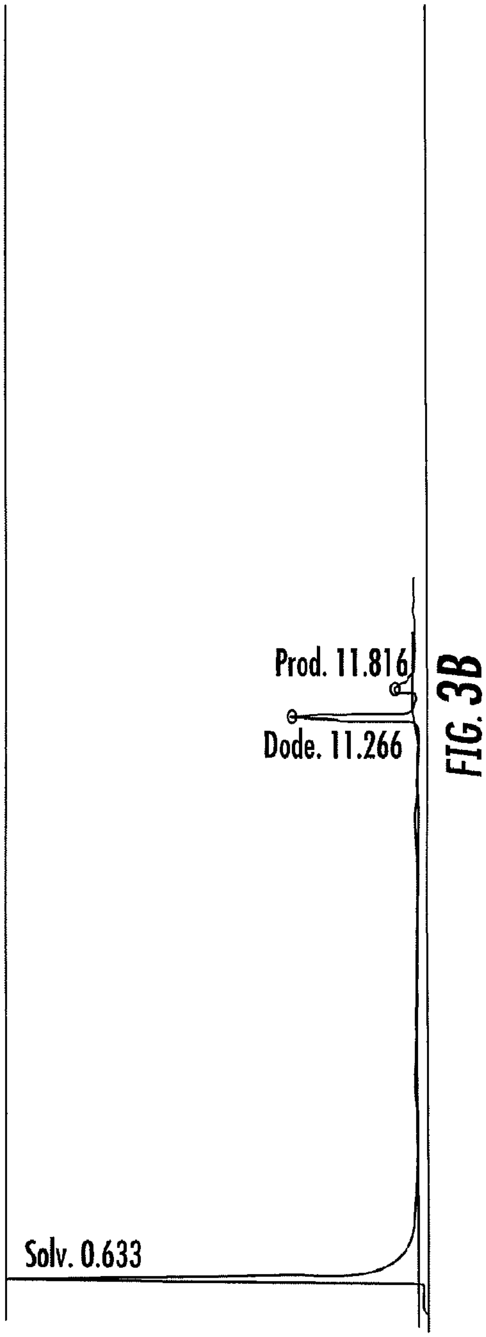

A stock solution of CEES (284.1 mg) and dodecane (182.6 mg) in acetonitrile (7.7526 g) was prepared. To each of four 40-mL vials was added ~200 mg of the catalyst beads prepared above. In two of the vials was added the higher loaded beads (8.2%), and the lower-loaded beads (5.5%) were added to the remaining two vials. Next, an aliquot of the CEES solution (~0.3 g) was added to each vial, followed by a stir-bar. The vials were sealed shut and then stirred vigorously. A control reaction was also set up by stirring an aliquot of the stock solution in a 40 mL vial without any catalyst present. (In previous experiments, controls have been run in the presence of stock Amberlite beads and demonstrated that the beads do not affect the CEES solutions.) Aliquots were removed after 2 h and 3 days, and the reaction was followed by gas chromatography. The results are shown in Table 2. The catalytic reactions were all complete after 3 days. After 2 h, CEESO was observable in the catalytic reactions. However, after the 3-day period, the concentration of CEESO appeared to drop. This is demonstrated in the GC traces shown in FIG. 3.

An interesting observation is that the turnover frequency after 2 h of reaction is consistent for both catalysts (this was measured in three of the four experiments). Both the higher loading catalyst and the lower loading catalyst turned over ~13 equivalents of CEES after 2 h. The preparation of the catalyst with 8% loading (entry 1, Table 1) has been repeated on a larger scale (10×), and has demonstrated that this material has a similar catalytic activity towards oxidation of CEES.

Experiments have also been conducted to determine that the catalytic oxidation of CEES is occurring heterogeneously, as desired, instead of in solution. First, two separate samples of the Amberlite-supported catalyst were treated with the stock solution of CEES and dodecane in acetonitrile. Each of these solutions were vigorously stirred for 15 min, and then transferred half of the supernatant from each vial into a fresh 40 mL vial. All four of the solutions were stirred overnight. After 16 h, the stirring was stopped and the progress of the oxidations were measured in the four vials by GC. It was found that all of the CEES had been oxidized in the solutions that were left exposed to the solid catalyst, but that none of the CEES was oxidized in the supernatants that were removed from the solid catalysts. This demonstrates that the catalysis occurs only on the active surface of the Amberlite-supported catalyst, and not in solution. This result is consistent with the previous observation that catalysts prepared from the sodium salts are insoluble in acetonitrile; the tetraalkyl ammonium salts are soluble and have previously shown catalytic activity in acetonitrile.

Spent catalysts were examined to determine if they have any residual activity. In particular, the catalyst from entry 3 in Table 2 was recovered, washed with acetonitrile (5×) and then dried. This catalyst was treated with a second dose of the CEES solution. The catalysts were not as active as they were in the first go-round; however, it did slowly oxidize the CEES. After 2 weeks of stirring (at the same loading level as in Table 2), the CEES was fully oxidized. As found earlier, the supernatant of this reaction mixture (which was removed from the catalyst after 1 h) did not show any catalytic oxidation.

Amberlite anion exchange resin is a suitable support for these POM catalysts. It is important to control the catalyst loading to a moderate level, e.g., <10% by weight. Higher loadings (e.g., 30%) appear to dramatically decrease the activity of the catalyst, presumably by filling pores and lowering the internal surface area of the support. This leads to a smaller amount of catalyst accessible to the catalyst in solution. Two different batches of the catalyst were prepared at lower loadings and have found that these catalysts oxidize CEES in acetonitrile solution. Although the activity of the catalysts drops during a second usage, they do remain active when recovered and re-used. The catalysis occurs on the solid catalyst and not in solution. The Amberlite-supported catalysts that we have prepared reproducibly oxidize CEES in solution, and are a promising approach for preparing catalysts that will oxidize CW agents on surfaces. This suggests that these catalysts are more stable than previous POM-based catalysts that we have worked with.

Example 3

General Methods and Materials

A-α-$Na_9PW_9O_{34}.24H_2O$ was prepared by the literature method (Domaille, P. J. In *Inorganic Syntheses*; Ginsberg, A. P., Ed.; John Wiley and Sons: New York, 1990; Vol. 27, pp 96-104), and its purity was checked by FT-IR. $Cu(NO_3)_2$, $FeBr_3$, TBABr, acetonitrile 1,3-dichlorobenzene, and 2-chlorethyl ethyl sulfide (CEES) were obtained from Aldrich and used without further purification. The infrared spectra were recorded on a Nicolet™ 6700 FT-IR spectrometer from ThermoElectron Corporation. Oxidation products were identified by gas chromatography-mass spectrometry (GC/MS; Hewlett Packard 5890 series II gas chromatograph connected to a Hewlett Packard 5971 mass selective detector) and quantified by gas chromatography (GC; Hewlett Packard 5890 series gas chromatograph equipped with a flame ionization detector, 5% phenyl methyl silicone capillary column, $N_2$ carrier gas, and a Hewlett Packard 3390A series integrator).

Preparation of "$Fe/Cu/PW_{11}/Br/NO_3$"

Step 1.

The preparation of an embodiment of the present disclosure was conducted starting with the preparation of $TBA_{9-X}Na_XPW_9O_{34}$. Solid A-$Na_9PW_9O_{34}.7H_2O$ (10 g, ca. 3.7 mmol) is dissolved in 100 mL of deionized water. To this solution TBABr (80 g, ca. 248 mmol) dissolved in 160 mL of deionized water is added. The mixture is stirred for 30 min at room temperature. The resulting precipitate $TBA_{9-X}Na_XPW_9O_{34}$ (ca. 15.8 g) is separated by filtration over a fine frit, washed with 2-3 100-mL portions of water, and vacuum dried overnight.

Step 2.

Solid $Cu(NO_3)_2$ (0.52 g, 2.8 mmol) is dissolved in 20 mL of acetonitrile, to which solid $TBA_{9-X}Na_XPW_9O_{34}$ (4.0 g, ~1.4 mmol) dissolved in 20 mL of acetonitrile is added with vigorous stirring. A greenish-blue solution is formed. The solution is placed in a beaker for several days until all solvent evaporated. The resulting white-blue product (4.5 g) henceforth is referred to as "$TBA/Cu/PW_{11}/NO_3$"

Step 3.

An arbitrary amount of "$TBA/Cu/PW_{11}/NO_3$" is weighted and mixed with $FeBr_3$ (1:1 weight %) using a mortar and pestle. The final product is dark brown and stored in a 100 ml brown vial. This product is referred to henceforth as "$Fe/Cu/PW_{11}/Br/NO_3$".

It should be noted that these preparations result in generation of $[PW_{11}O_{39}]^{7-}$ in situ. In other words, the slightly acidic conditions convert $[PW_9O_{34}]^{9-}$ to $[PW_{11}O_{39}]^{7-}$ in situ during preparation of the ultra-reactive catalyst. If one starts with $TBA_{7-x}Na_xPW_{11}O_{39}$ in place of $TBA_{9-x}Na_xPW_9O_{34}$, a reactive catalyst is also formed.

Catalytic Oxidation of the HD Analogue 2-chloroethyl ethyl sulfide (CEES) in Acetonitrile Solution In a typical CEES oxidation reaction, 0.01 mmol of "$Fe/Cu/PW_{11}/Br/NO_3$" (~32 mg) is weighed out into 20-mL vial and suspended in 2.3 mL of acetonitrile. 1,3-Dichlorobenzene (0.095 mL) (GC internal standard) is added to the vials, and they are sealed. After stirring for 10-20 min, 0.105 mL CEES is added via syringe to a vial fitted with a PTFE septum. Air access during the experiment is provided through a needle in the cap. The reaction is monitored for 20 h. Aliquots are analyzed by GC analysis every 20 min.

Example 4

This example describes compositions of $TBAFeBr_4$:$TBA_xCuPW_{11}O_{40}$ from a mixture ratio of 1:9 to 9:1.

Turnovers are defined as: Moles of Product/Moles of Catalyst. In this example, the product, CEESO, is the degradation of the target, 2-CEES.

TABLE 1

Example 4
Aerobic Oxidation of 2-Chloroethyl Ethyl Sulfide (CEES) in Acetonitrile by Nitrate and Bromide-containing Polyoxometalate (POM) based catalysts.[a]

| $TBAFeBr_4$:$TBA_xCuPW_{11}O_{40}$ | Turnovers[b] at 30 min | Turnovers[b] at 60 min |
|---|---|---|
| 1:9 | 50 | 57 |
| 2:8 | 50 | 62 |
| 3:7 | 36 | 62 |
| 4:6 | 46 | 61 |
| 5:5 | 36 | 50 |
| 6:4 | 33 | — |
| 7:3 | 20 | 42 |
| 8:2 | 7 | 23 |
| 9:1 | — | 4 |

[a]General conditions: 0.875 mmol (0.35 M) of CEES, catalyst (0.06 g), 1 atm of air, 0.876 mmol (0.35 M) of 1,3-dichlorobenzene (internal standard) were stirred in 2.5 mL of acetonitrile at 25° C. in the 20-mL vial;
[b]turnovers = moles of CEESO/moles of POM.

Example 5

The effect of different first row transition metals on the embodiment of the present disclosure (e.g., $Me/POM/NO_x$)

was studied. The resulting data show that without transition metals the composition is totally inactive, and the composition is activated by addition of transition metals. Among these metals, Cu shows the best activation capability and the Cu containing catalyst has the best catalytic activity.

General Methods and Materials

A-α-$Na_9PW_9O_{34}$.$24H_2O$ was prepared by the literature method (Domaille, P. J. In *Inorganic Syntheses*; Ginsberg, A. P., Ed.; John Wiley and Sons: New York, 1990; Vol. 27, pp 96-104), and its purity was checked by FT-IR. $Cr(NO_3)_3$.$9H_2O$, $Mn(NO_3)_2$, $Co(NO_3)_2$, $Ni(NO_3)_2$.$6H_2O$, $Cu(NO_3)_2$, $Zn(NO_3)_2$, $FeBr_3$, TBABr, acetonitrile 1,3-dichlorobenzene, and 2-chlorethyl ethyl sulfide (CEES) were obtained from Aldrich and used without further purification. The infrared spectra were recorded on a Nicolet™ 6700 FT-IR spectrometer from ThermoElectron Corporation. Oxidation products were identified by gas chromatography-mass spectrometry (GC/MS; Hewlett Packard 5890 series II gas chromatograph connected to a Hewlett Packard 5971 mass selective detector) and quantified by gas chromatography (GC; Hewlett Packard 5890 series gas chromatograph equipped with a flame ionization detector, 5% phenyl methyl silicone capillary column, $N_2$ carrier gas, and a Hewlett Packard 3390A series integrator).

Preparation of Different Metal Substitute Catalysts: "M/Cu/$PW_{11}$/Br/$NO_3$" (M Equals to Cr, Mn, Co, Ni, Cu and Zn)

Step 1.

The preparation of the composition was conducted starting with the preparation of $TBA_{9-x}Na_xPW_9O_{34}$. Solid A-$Na_9PW_9O_{34}$.$7H_2O$ (10 g, ca. 3.7 mmol) is dissolved in 100 mL of deionized water. To this solution TBABr (80 g, ca. 248 mmol) dissolved in 160 mL of deionized water is added. The mixture is stirred for 30 min at room temperature. The resulting precipitate $TBA_{9-x}Na_xPW_9O_{34}$ (ca. 15.8 g) is separated by filtration over a fine frit, washed with 2-3 portions of 100 mL of water, and vacuum dried overnight.

Step 2.

Solid $M(NO_3)_x$.$yH_2O$ (1.4 mmol) was dissolved in 20 mL of acetonitrile, to which solid $TBA_{9-x}Na_xPW_9O_{34}$ (4.0 g, ~1.4 mmol) dissolved in 20 mL of acetonitrile is added with vigorous stirring. The solution is placed in a beaker for several days until all solvent evaporated. The resulting product (ca. 4.5 g) henceforth is referred to as "TBA/M/$PW_{11}$/$NO_3$"

Step 3.

An arbitrary amount of "TBA/M/$PW_{11}$/$NO_3$" is weighted and mixed with $FeBr_3$ (1:1 weight %) using a mortar and pestle. The final product is dark brown and stored in a 100 ml brown vial. This hot catalyst is referred to henceforth as "Fe/M/$PW_{11}$/Br/$NO_3$"

Catalytic Oxidation of the HD Analogue 2-chloroethyl ethyl sulfide (CEES) in Acetonitrile Solution In a typical CEES oxidation reaction, 0.1 g of "Fe/M/$PW_{11}$/Br/$NO_3$" is weighed out into 20-mL vial and suspended in 2.3 mL of acetonitrile. 1,3-Dichlorobenzene (0.095 mL) (GC internal standard) is added to the vials, and they are sealed. After stirring for 10-20 min, 0.105 mL CEES is added via syringe to a vial fitted with a PTFE septum. Air access during the experiment is provided through a needle in the cap. The reaction is monitored for 2 hours. Aliquots are analyzed by GC analysis every 20 min.

Results

Figure 4:
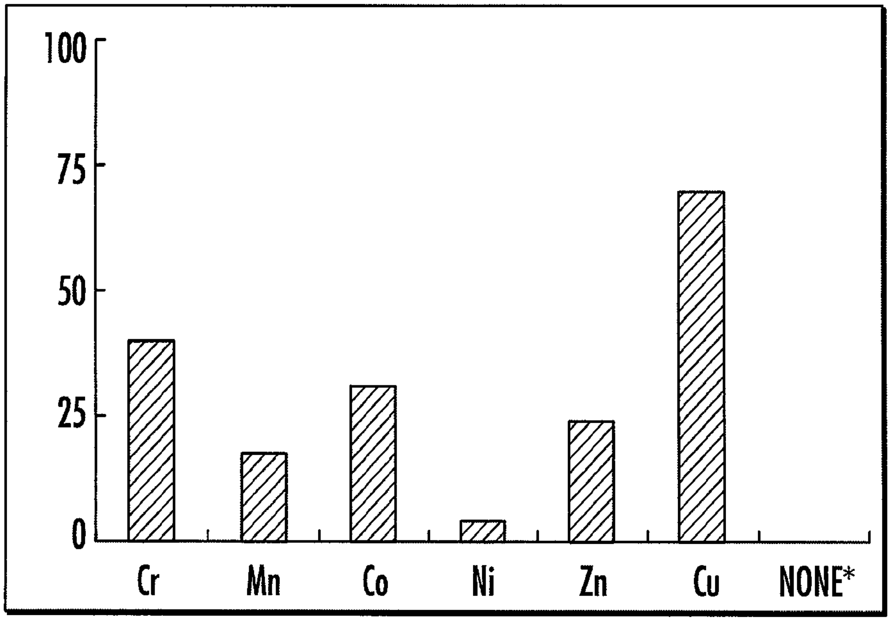
FIG. 4 is a graph that illustrates the conversion of CEES oxidation after an hour in the presence of 5 mM metal-POM and 34 mM $TBAFeBr_4$; 25° C., 1 atm $O_2$, 2.5 mL $CH_3CN$, [CEES]=360 mM; * 5 mM of pure $TBA_7PW_{11}O_{39}$ is used instead of a metal-POM.

FIG. 4 is a table that shows the conversion of CEES oxidation after an hour in the presence of different transition metals. It is clear that when no transition metals are present the catalyst is totally inactive, and the catalytic activities vary with different metals. The sample containing Cu gives the best catalytic performance and the conversation reaches about 75% in an hour.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

It should be emphasized that the above-described embodiments of the present disclosure, particularly, any "preferred" embodiments, are merely possible examples of implementations, and are merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The following are claimed:

1. A POM-based catalyst comprising bromide, comprising:

a compound having the formula Me/POM/$NO_x$, wherein "Me" is independently selected from: copper (Cu), iron (Fe), chromium (Cr), cobalt (Co), nickel (Ni), manganese (Mn), and zinc (Zn); wherein "x" is 1, 2, or 3;

wherein POM is selected from $[PW_{11}O_{39}]^{7-}$, $[SiW_{11}O_{39}]^{8-}$, $[SiW_{10}O_{36}]^{8-}$, and $[SiW_9O_{34}]^{10-}$.

2. The catalyst of claim 1, wherein the structure of Me/POM/$NO_x$ is selected from: [MePOM][$NO_x$] and [MePOM$NO_x$].

3. The catalyst of claim 1, wherein Me is Cu.

4. A solid support selected from carbon, cationic silica, $TiO_2$, and $Al_2O_3$ comprising a catalyst of claim 1.

5. The solid support of claim 4, wherein the solid support is porous or nonpourous.

* * * * *

UNITED STATES PATENT AND TRADEMARK OFFICE

CERTIFICATE OF CORRECTION

PATENT NO. : 8,435,923 B2
APPLICATION NO. : 12/294696
DATED : May 7, 2013
INVENTOR(S) : Okun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 925 days.

Signed and Sealed this
Eighth Day of September, 2015

Michelle K. Lee
*Director of the United States Patent and Trademark Office*